US006799318B1

(12) United States Patent
Davison et al.

(10) Patent No.: US 6,799,318 B1
(45) Date of Patent: Sep. 28, 2004

(54) METHOD HAVING MULTIPLE INTERFACES WITH DISTINGUISHED FUNCTIONS AND COMMANDS FOR PROVIDING SERVICES TO A DEVICE THROUGH A TRANSPORT

(75) Inventors: Eric Davison, Seattle, WA (US); Stanley W. Adermann, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 669 days.

(21) Appl. No.: 09/587,753

(22) Filed: Jun. 5, 2000

Related U.S. Application Data

(63) Continuation-in-part of application No. 09/552,320, filed on Apr. 24, 2000, now abandoned.

(51) Int. Cl.[7] ............................................. G06F 3/00
(52) U.S. Cl. ................................................... 719/328
(58) Field of Search ............................. 709/228, 230, 709/250, 302; 719/328; 717/108

(56) References Cited

U.S. PATENT DOCUMENTS

| | | | | | |
|---|---|---|---|---|---|
| 5,136,716 | A | * | 8/1992 | Harvey et al. | 709/228 |
| 5,386,568 | A | * | 1/1995 | Wold et al. | 717/162 |
| 5,425,028 | A | * | 6/1995 | Britton et al. | 370/389 |
| 5,548,723 | A | * | 8/1996 | Pettus | 709/228 |
| 5,572,724 | A | * | 11/1996 | Watanabe et al. | 707/200 |
| 5,612,898 | A | | 3/1997 | Huckins | |
| 5,706,437 | A | * | 1/1998 | Kirchner et al. | 709/203 |
| 5,710,908 | A | * | 1/1998 | Man | 709/230 |
| 5,758,186 | A | | 5/1998 | Hamilton et al. | |
| 5,987,517 | A | * | 11/1999 | Firth et al. | 709/230 |
| 6,023,698 | A | * | 2/2000 | Lavey et al. | 707/10 |
| 6,032,198 | A | * | 2/2000 | Fujii et al. | 719/328 |
| 6,247,020 | B1 | * | 6/2001 | Minard | 707/104.1 |
| 6,351,776 | B1 | * | 2/2002 | O'Brien et al. | 709/245 |
| 6,408,342 | B1 | * | 6/2002 | Moore et al. | 709/330 |
| 6,434,617 | B1 | * | 8/2002 | Clough et al. | 709/227 |
| 6,591,295 | B1 | * | 7/2003 | Diamond et al. | 709/217 |

OTHER PUBLICATIONS

Artisoft, "Using NodeRunner/SI with NDIS," 1993, 8 pages.
Moore, "Windows, Wireless Architecture", 71 pages.
Ray et al., "Bluetooth Stack in Windows", 30 pages.
*Specification of the Bluetooth System*, v1.0B, Dec. 1, 1999.
Riku Mettala et al., *Bluetooth Protocol Architecture* (White Paper), v1.0, Nokia Mobile Phones, Sep. 29, 1999.
Brent Miller et al., *Mapping Salutation Architecture APIs to Bluetooth Service Discovery Layer* (White Paper), v1.0, IBM Corporation, Jul. 1, 1999.
IEEE Standard, 802.11, *Part 11: Wireless LAN Medium Access Control (MAC) and Physical Layer (PHY) Specifications*, 1st Ed. 1999, and Supplements 802.11a–1999 and 802.11b–1999.
Bob O'Hara and Al Petrick, *IEEE 802.11 Handbook A Designer's Companion*, Dec. 1999.
Pat Megowan et al., *IrDA Object Exchange Protocol*, v1.2, Counterpoint Systems Foundry, Inc. Microsoft Corporation, Mar. 18, 1999.

* cited by examiner

*Primary Examiner*—Krisa Lim
(74) *Attorney, Agent, or Firm*—Leydig, Voit & Mayer, Ltd.

(57) ABSTRACT

A protocol independent implementation of the OBEX specification that allows OBEX applications to communicate without having to know transport specific details is presented. OBEX services reside on top of an OBEX layer and the layer communicates with the transports with a interface that is independent of the transport protocol and other interfaces are provided when connections are created. OBEX applications use the protocol independent interface to communicate with OBEX services and other applications and to transfer data via the transports. A primary interface is provided that has commands to enumerate transports and to enumerate devices. Other interfaces include a transport interface for communicating with a transport, a service interface for determining when an incoming connection arrives, and a device interface for communicating with the at least one device.

15 Claims, 7 Drawing Sheets

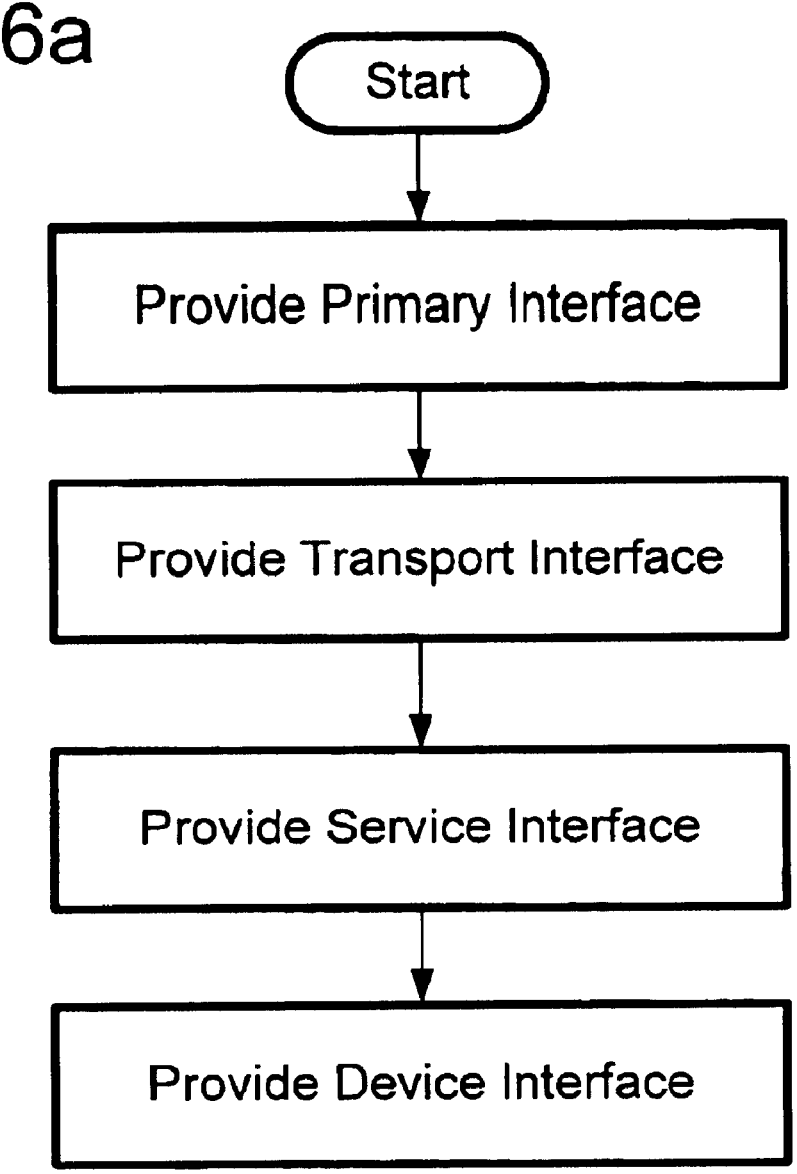

METHOD HAVING MULTIPLE INTERFACES WITH DISTINGUISHED FUNCTIONS AND COMMANDS FOR PROVIDING SERVICES TO A DEVICE THROUGH A TRANSPORT

RELATED APPLICATIONS

This application is a continuation in part of U.S. patent application No. 09/552,320 filed Apr. 24, 2000, now abandoned.

TECHNICAL FIELD

This invention relates generally to communication between electronic devices and, more particularly, relates to methods to transfer data and objects between electronic devices.

BACKGROUND OF THE INVENTION

OBEX (Object Exchange) is a protocol that is similar to the Hypertext Transfer Protocol (HTTP). It provides the same basic functionality in a lighter fashion using a client-server model. OBEX consists of a protocol and an application framework. The application framework is built on top of the protocol and is used to ensure interoperability between devices and applications using OBEX. The protocol consists of a format for communication between devices and applications and a set of functions. The functions include initiating a connection, disconnecting a connection, sending an object from a client to a server (push operation), and requesting that a server return an object to a client (pull operation).

Presently, there are 3 transports—IP, IrDA, and Bluetooth—that OBEX can operate over. Applications and devices need to know transport specific information before using a particular transport. OBEX applications typically have to be re-written each time a transport using a different protocol becomes available. More transports are becoming available that use OBEX. Re-writing OBEX applications for each new transport is time consuming and destabilizing and adds to both the development and testing effort. A method is needed whereby applications can be run on new transports that become available without having to be re-written.

SUMMARY OF THE INVENTION

In view of the aforementioned problems, OBEX is implemented in such a way as to expose a protocol independent interface. This allows OBEX applications to communicate without having to know transport specific information. The main advantage to this approach is that OBEX applications will not need to be re-written when a new protocol for OBEX becomes available. Only a small piece of transport specific data needs to be updated in order for the application to work over the new transport.

The OBEX services reside on top of an OBEX layer. The OBEX layer communicates with the transports with a interface that is independent of the transport protocol and other interfaces are provided when connections are created. The OBEX layer allocates packets and post them down to the transports for incoming data from an application or module. When an incoming data packet is received from a transport, the layer determines which of the OBEX services should receive notification, abstracts the OBEX data and provides it to the appropriate OBEX services. The OBEX layer generates outbound packets for data passed into the OBEX layer by an OBEX service. The layer generates the correct headers for the protocol being used and sends the outbound packets down to the appropriate transport for sending to an application or module.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6a is a block diagram illustrating the steps of providing a service to a device through a transport provider; and FIG. 6b is a block diagram illustrating the functions of the interfaces of FIG. 6a.

DETAILED DESCRIPTION OF THE INVENTION

Figure 1:
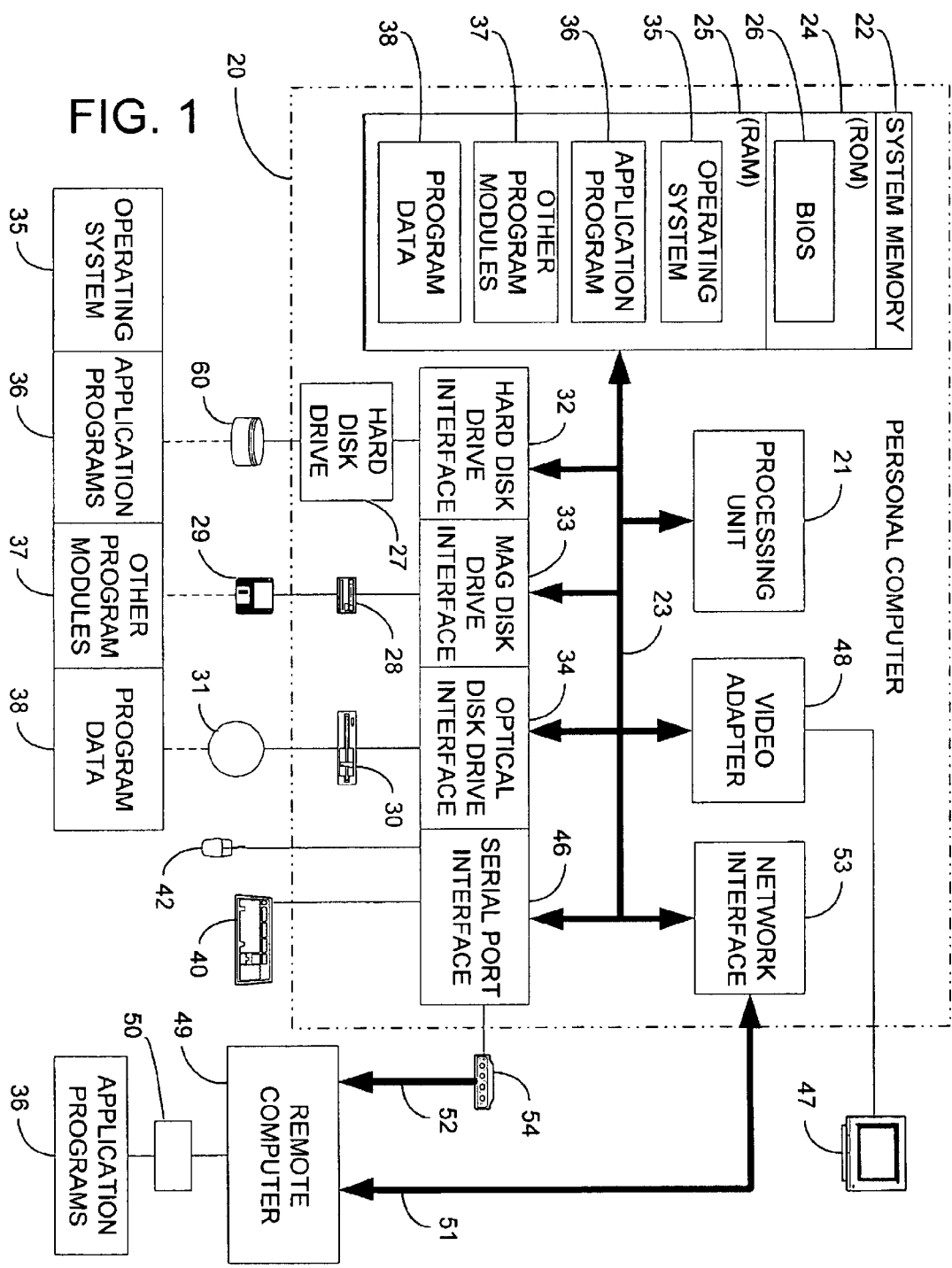
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
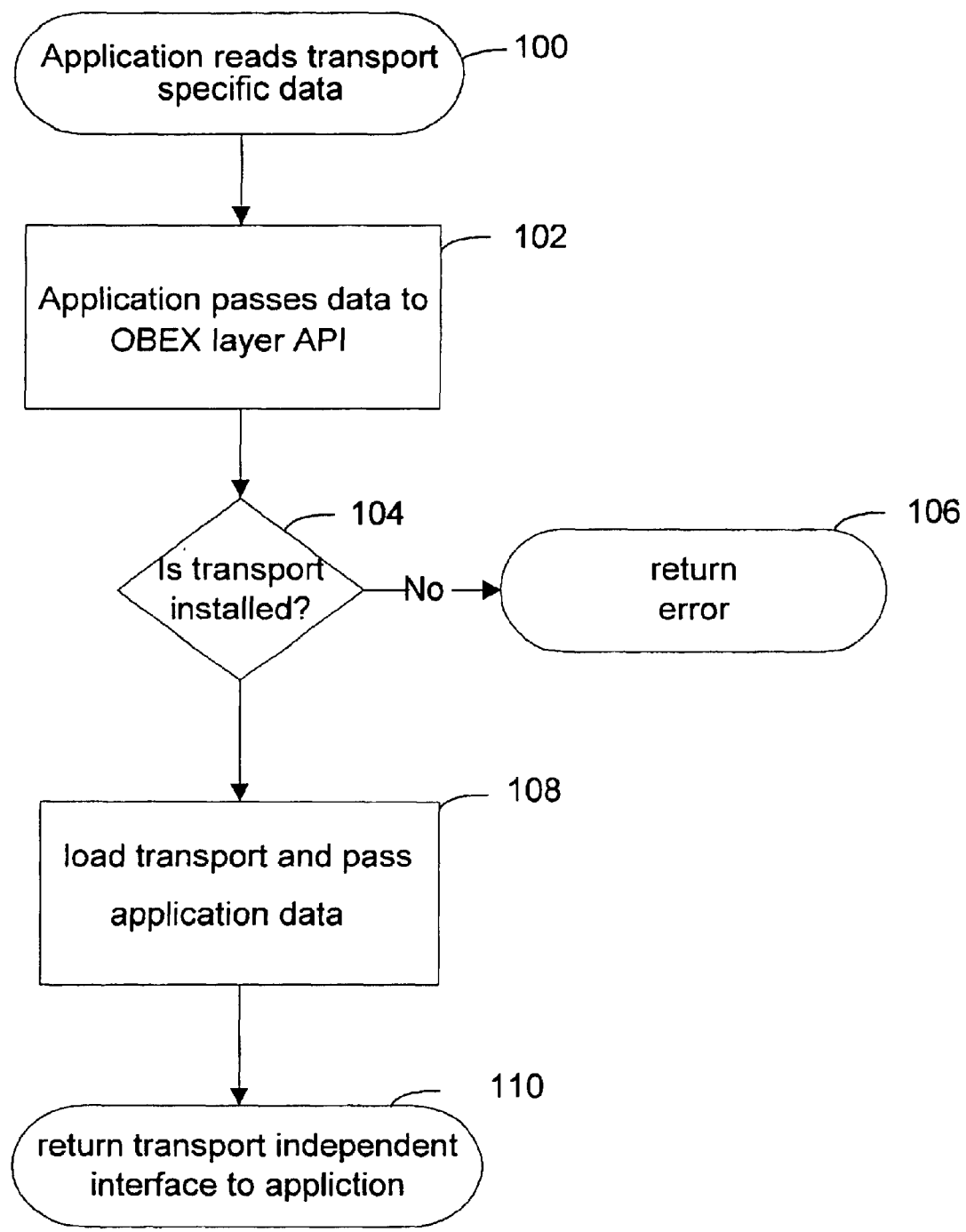
FIG. 2 is a flowchart illustrating the steps taken to determine which transport to use in accordance with the teachings of the invention.
Figure 3:
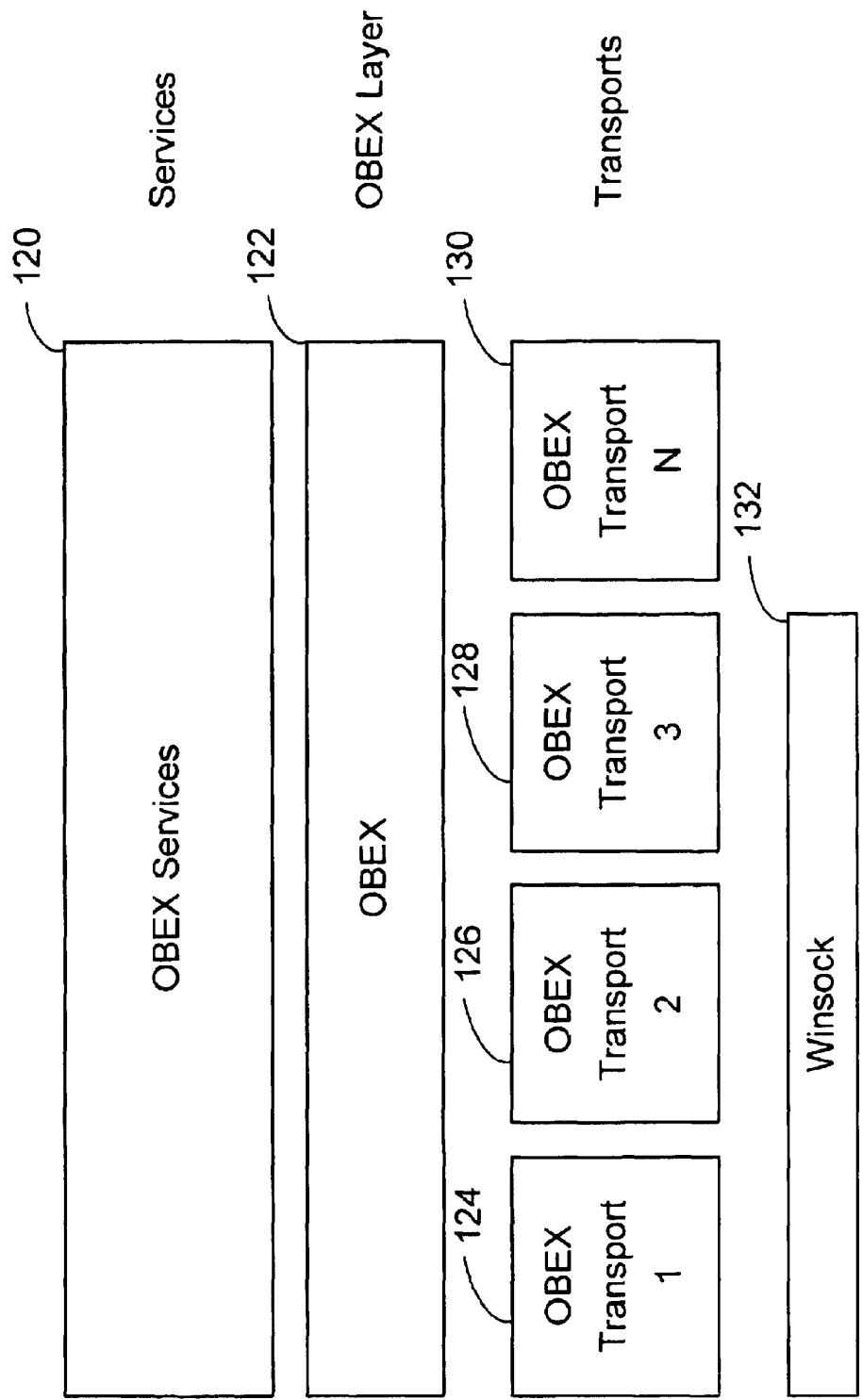
FIG. 3 is a block diagram illustrating an embodiment of an operating system for directing data through a plurality of transport providers.

The invention will be described in the context of the Windows operating system. It should be understood that the instant invention is applicable to other operating systems such as the Macintosh operating system from Apple Computer, Inc. and the OS/2 operating system from IBM. Turning now to FIGS. 2 and 3, in order to expose multiple transports through OBEX without applications needing to be re-written, a dynamic link library, OBEX.dll, is used to implement the OBEX specification, and the Windows registry, or some other data store, stores transport specific data that can be read at start-up.

FIG. 2 illustrates the steps taken to allow an application to communicate on a network. An Application Programming Interface (API) allows OBEX applications to pass transport specific data to the OBEX layer to initialize the networking subsystem (steps 100, 102). The data has a pre-defined format such that the OBEX layer can determine which transport the data is for and check to see if the transport is installed (step 104). If the transport which the data is for is not installed, an error message is returned (step 106). If the transport is installed, the OBEX layer then creates the appropriate transport module and passes the transport specific data down to that module (step 108). The OBEX layer then returns a transport independent interface to the application to use whenever it communicates on the network (step 110).

In one embodiment, this data can be generated at setup time by reading a device information file (e.g., an INF). OBEX services 120 reside on top of the OBEX layer 122. The OBEX layer 122 allocates packets and post them down to the transports 124, 126, 128, 130 for incoming data. When an incoming data packet is received, OBEX layer 122 determines which OBEX service should receive notification and abstracts OBEX data and provides the OBEX data to the OBEX services 120. Outgoing data passed into the OBEX layer 122 from OBEX services 120 may not be in the correct protocol format for the transport being used. OBEX layer 122 generates outbound packets with correct wheaders for the protocol being used and sends the outbound packets down to the appropriate transport.

Each transport defines the INF file layout and provides a small application to convert the information into something the application can pass through the OBEX layer 122. In this embodiment, application transport specific data is stored in the registry and can be read in at startup time. When a new transport is brought on-line it is registered so that the OBEX layer knows about it as well. For an application to support a new transport, all that needs to be done is to have the application written in such a way that it reads data from the registry and passes it through the OBEX APIs. In this manner the code has no knowledge of what transport it is using.

Enumeration of OBEX devices is done at the OBEX layer 122 and information about other OBEX clients is passed to the application in a generic fashion. The application can then display the choices to the user to select. The information about the transport 124, 126, 128, 130 the OBEX device is using is obtained in a standard fashion as known by those skilled in the art such that it can be enumerated and presented to the user without knowing the details of the information. For an OBEX client to connect to a remote device it would just need to pass the information generated by the OBEX layer to connect.

OBEX server applications initialize their transport information by reading data from the registry. At install time the registry is configured with all the necessary information to initialize the transports 124, 126, 128, 130. The transports 124, 126, 128, 130 communicate with other applications through the Windows Sockets provider (Winsock) 132. The transports 124, 126, 128, 130 know how to discover devices and send and receive data across a network medium and do not need to have any knowledge of the OBEX protocol. Winsock 132 consists of a kernel driver and a set of user-mode dynamic link libraries (DLLs) and it allows programs to communicate with other programs and machines via protocols such as TCP/IP, Bluetooth, etc.

Figure 4:
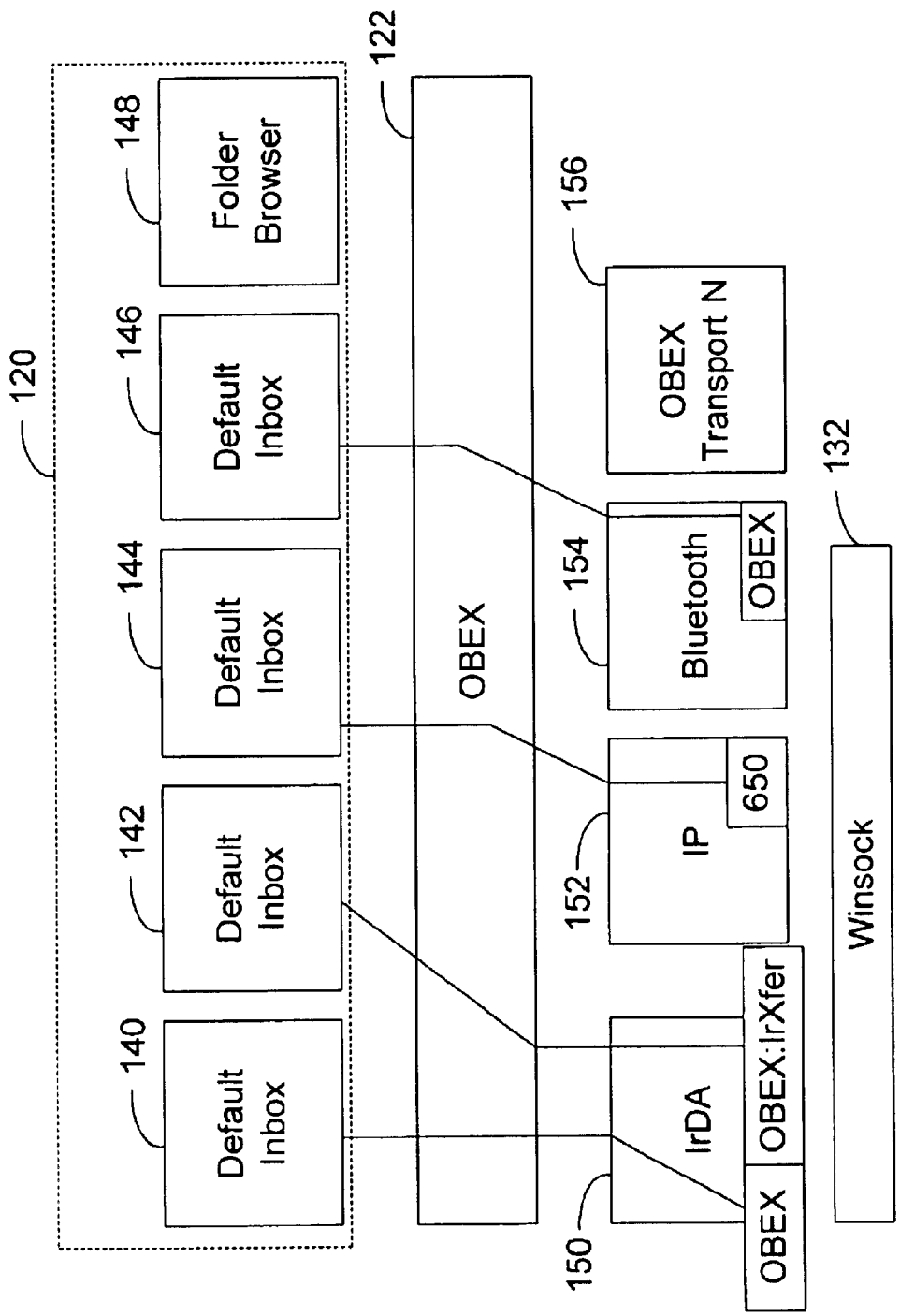
FIG. 4 is a block diagram illustrating OBEX services and OBEX transports in the operating system of FIG. 3.

Turning now to FIG. 4, OBEX services 120 has several default services. Two of these services are the default inbox 140, 142, 144, 146 and folder browser 148. The default inbox allows a sending device (i.e., a client) to send a file or an object to a receiving device (i.e., a server) without having to know the folder hierarchy of the receiving device. The client sends the file/object to the server and the server is responsible for placing the file/object in the correct location. The functionality provided the default inbox 140, 142, 144, 146 may be the same, but each instance of a default inbox will be listening on a different transport/port combination. Default inbox 140 listens on IrDA transport 150 on the OBEX port. Default inbox 142 listens on IrDA transport 150 on the OBEX:IrXfer port. Default inbox 144 listens on IP transport 152 on port 650. Default inbox 146 listens on Bluetooth transport 150 on the Bluetooth OBEX port. The folder browser 148 allows a client to browse folders on a device and put objects into and get objects out of the folders. The folder browser 148 listens on the same ports as the default inboxes 140, 142, 144, 146.

The application programming interfaces used to implement the instant invention shall now be described. These interfaces are IOBEX, IOBEXService, IOBEXServiceConnection, IOBEXDevice, IOBEXTransport, IOBEXTransportSocket, IOBEXTransportConnection, and IOBEXSink.

The IOBEX interface is the main interface to the OBEX services. The IOBEX interface contains a set of functions preferably including EnumTransports, Register Service, RegisterServiceBlob, and EnumDevices. EnumTransports returns an ITransportEnum pointer that is used to enumerate the known transports. The ITransportEnum interface will enumerate a list of transport property bag interfaces. Each transport property bag interface has a globally unique identifier (i.e., GUID) associated with it and a list of properties for that transport. An OBEX service that wishes to register can use this list of services to determine what needs be configured for that particular transport. The transport property bag interface can then be passed to the register service call once all of the properties are set. RegisterServiceBlob takes a blob (i.e., an information package) that describes the service information. The format of this blob is transport specific and is typically created at setup time of the service. At run time, the service reads in the blob and passes in the data to RegisterService. The only part of the information package the OBEX layer will interpret is the transport with which the information package is destined. The RegisterService function takes transport property bag that contains all of the properties that have been set by the user and uses these values to configure the service. An IObexService interface is returned if either of the two functions are successful. The EnumDevices function returns an IDeviceEnum interface that can be used to walk the list of devices within range. Notifications will be returned using the connection point model defined by the Windows COM.

The IOBEXService interface is used to listen for incoming connections and close the instance of an OBEX service. This interface contains a set of functions preferably including GetConnection, Close, and SetPassword. The GetConnection function listens for incoming connections for a service. The function can be used to poll for incoming connections or to wait until one arrives. When a connection comes in, the function returns an IObexServiceConnection interface. The Close function shuts down the particular instance of an OBEX service. The SetPassword function sets the password required to access the service upon connecting.

The IOBEXServiceConnection interface is used after a connection is made. This interface contains a set of functions preferably including Accept, Close, GetCommand, and EnumProperties. The Accept function accepts an incoming connection and it should be called before GetCommand. The Close function closes the current connection and sends a disconnect request to the client. If the connection has not yet been accepted, an error response will be sent to the client. The GetCommand function listens for incoming command requests from the client. This function can be used for either polling for an incoming command or to block and wait for a command. The function will return a command structure. The EnumProperties function is used by the interface user to get the properties of the connection. This method will return a set of properties that specifies the client information. The caller should use this information along with the header information to determine if the connection should be accepted.

The command structure has several fields and properties that describe the command. The properties are the opcode and any flags. The structure has a pointer to an IHeaderCollection interface which can be used to enumerate the headers. All headers can be displayed here except any body headers, which can be accessed through the stream interface. The stream interface is also returned in the structure. The SendResponse function is used for those commands that do not have any data associated with them and only require a response from the server. This function can be called to generate a response code to the client.

The IOBEXDevice interface is obtained by the EnumDevices call of IObex. The IObexDevice interface exposes a property bag that describes the device. The property bag includes standard properties such as Name, Address and Transport which define the device. The address is transport specific, but is presented to the user as a string. This interface contains a set of functions preferably including Connect, Put, Get, Abort, SetPath, and Disconnect. The Connect function connects to the device specified and it operates in blocking mode. A password for the device can be specified at this point. If a password is not specified and the server requires a password, a callback will be made to the interface registered on the main OBEX object. If no interface has been registered for callbacks then the function will fail if a password is required. The Put function issues a put command to the server for the object that is passed in. The user builds a collection of headers that describes the object using the IHeaderCollection interface. The Put function returns an IStream interface, which the user can use to write any data that needs to be sent. The Get function does a get request of an object on an OBEX server. An IHeaderCollection interface will be passed in to describe the object. The Get function also returns an IStream interface with which the user can read the incoming data. The Abort function sends an abort request to the server. The SetPath function issues a SetPath command to the server. The Disconnect function disconnects the specified connection.

The IOBEXTransport interface is used by the OBEX layer 122 to communicate with the transports 124, 126, 128, 130. All notifications that arise from objects created from this interface will use the callback interface specified on the object. This interface contains a set of functions preferably including Init, CreateSocket, EnumDevices, EnumProperties, and Shutdown. The Init function initializes the transport. The CreateSocket function creates a socket that can then be used for listening on or connecting to other devices. When a socket is created, this function returns an IOBEXTransportSocket interface. There are two versions of CreateSocket function. The first version takes a information package that is passed in by the user. The data in the information package is defined by the transport and can be unknown to the OBEX layer 122. The OBEX layer 122 just passes the information to the correct transport provider. The second version of this function takes a property collection that contains the properties necessary to create a listening socket. The EnumDevices function returns a list of known devices of the specified type. The information returned is an enumeration of property collection. Each collection of properties defines a device. When a connection to a device is made, the collection of properties that defines the device is passed in. The EnumProperties function retuns an enumeration of all the necessary properties required to create a listening socket on the transport. The property collection is to the user through the IObex::EnumTransport function to be filled in. The collection can then be passed through the IObex::RegisterService function and down through the CreateSocket method of the IOBEXTransport interface to create a listening socket. The Shutdown function closes the transport.

The IOBEXTransportSocket interface is used to listen for incoming connections and to connect to another device. This interface contains a set of functions preferably including Close, Listen, Connect, and EnumProperties. The Close function closes the socket. The Listen function is used by on OBEX server to listen on a port for incoming connections. Once an incoming connection comes in, this function returns an IobexTransportConnection interface. The Connect function connects to another device. Once a connection is made, this function returns an IobexTransportConnection interface. The EnumProperties function returns information about the socket.

The IOBEXTransportConnection interface provides functions that allow a user to read and write to a connection and to find out where the connection is coming from. This interface contains a set of functions preferably including Close, Write, Read, and EnumProperties. The Close function closes the connection. The Write function sends data on the connection. The Read function receives data on the connection. The EnumProperties function returns information about the connection.

Figure 5:
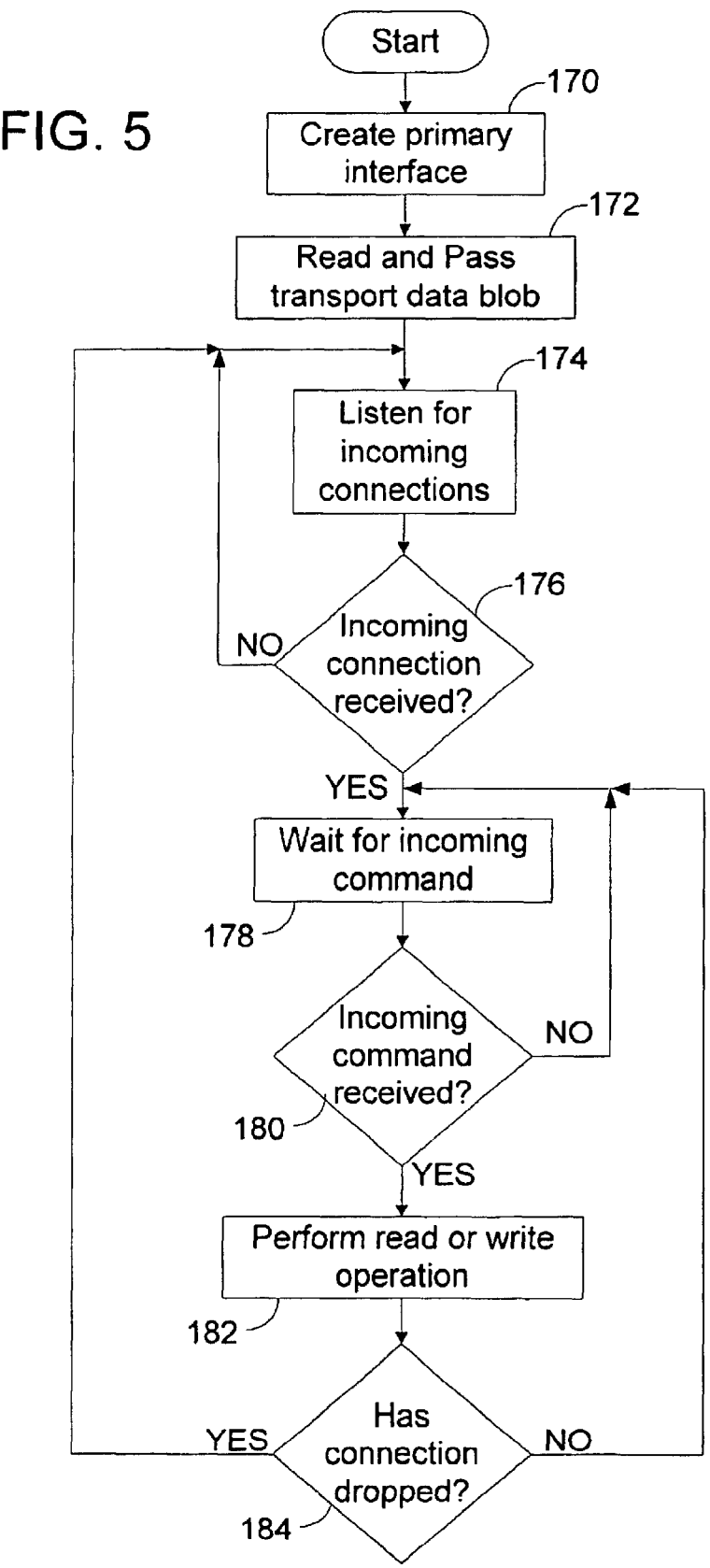
FIG. 5 is a block diagram illustrating the steps of sending an object between devices.

The IOBEXSink interface is the callback interface that will be queried on the Advise calls of the Iobex interface. This interface contains a set of functions preferably including Notify. The notify function is called whenever there is an event. Events are used to notify the user of incoming requests. An example of incoming requests are disconnect or an abort. Events through this interface can also query the user for a password on a connection. The definition of the parameters passed to the function depends on the message. Client events are disconnect, abort, new device list available, query password. Server events are disconnect, abort, query password, incoming connection, and incoming command. Transport events are new device. Turning now to FIG. 5, an inbox service 140, 142, 144, 146 is created using the interfaces described above. The primary interface IObex is created (step 170) and the transport data blob is read from the registry. The transport data blob is passed to the RegisterServiceBlob function of the Iobex interface, which returns an IObexService interface (step 172). The IObexService GetConnection function is called to listen to wait for incoming connections (step 174). When an incoming connection is received, the IObexServiceConnection interface is returned and the Accept function of the IobexServiceConnection interface is called to accept the incoming connection (step 176). The properties and headers of the connection can be queried to find out more about the connection request and the device requesting the connection. The GetCommand function of IobexServiceConnection is called to wait for an incoming command (step 178). When an incoming command is received, a command structure will be returned (step 180). The command structure describes the command and provides a stream in which data can be received from the client or sent to the client. A read or write operation is performed in response to receiving an incoming command (step 182). Data is read if the incoming command is a Put request or data is written if the incoming command is a Get request. The stream is then released and the GetCommand function of IobexServiceConnection is called to wait for an incoming command. If the connection is dropped, the GetCommand function returns an appropriate error. If the connection is lost, the IObexServiceConnection interface is released and the GetConnection function of the IObexService is called to wait for incoming connections (step 184).

Figure 6B:
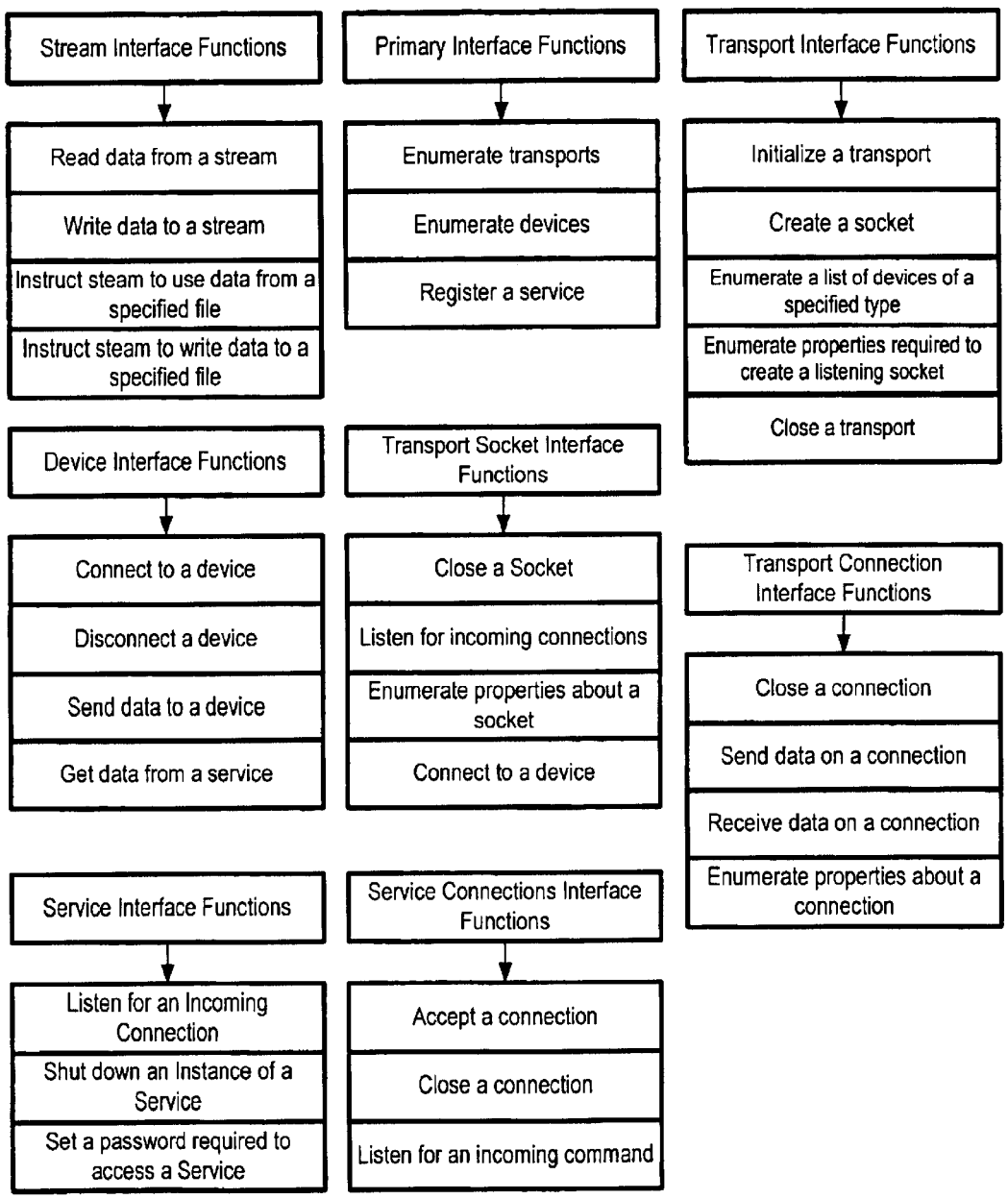

Turning now to FIGS. 6a and 6b, the general steps in providing a service to a device through a transport is shown. The primary interface, such as the IOBEX interface is provided. As previously described, the primary interface has commands to enumerate transports and to enumerate devices. The transport interface, such as IOBEXTransport, IOBEXTransportSocket, and IOBEXTransportConnection is provided for communicating with the transports. A service interface, such as IOBEXService and IOBEXServiceConnection, is provided to determine when an incoming connection arrives and accepting the incoming connection. Once connected, a device interface, such as IOBEXDevice, is provided for communicating with the device.

A protocol independent implementation of OBEX has been described with specific embodiments that allows OBEX applications to communicate without having to know transport specific information. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having computer-executable instructions for performing steps to provide at least one service to at least one device through at least one transport, the steps comprising:
   providing a primary interface, the primary interface having a command to enumerate transports and to enumerate devices;
   providing a transport interface for communicating with the at least one transport wherein the transport interface comprises:
      a function to initialize a transport;
      a function to create a socket;
      a function to enumerate a list of devices of a specified type;
      a function to enumerate properties required to create a listening socket; and
      a function to close a transport;
   providing a service interface for determining when an incoming connection arrives; and
   providing a device interface for communicating with the at least one device.

2. The computer-readable medium of claim 1 having further computer-executable instructions for providing a transport socket interface if a socket is created.

3. The computer-readable medium of claim 2 wherein the transport socket interface comprises:
   a function to close a socket;
   a function to listen for incoming connections;
   a function to enumerate properties about a socket; and
   a function to connect to at least one of the at least one device.

4. The computer-readable medium of claim 3 having further computer-executable instructions for providing a transport connection interface if at least one of the at least one device is connected.

5. The computer-readable medium of claim 4 wherein the transport connection interface comprises:
   a function to close a connection;
   a function to send data on the connection;
   a function to receive data on the connection; and
   a function to enumerate properties about the connection.

6. The computer-readable medium of claim 1 wherein the device interface comprises:
   a function to connect to a device;
   a function to disconnect the device;
   a function to send data to the device; and
   a function to get data from the at least one service.

7. The computer-readable medium of claim 1 wherein the primary interface comprises:
   a function to enumerate transports;
   a function to enumerate devices; and
   a function to register a service.

8. A computer-readable medium having computer-executable instructions for performing steps to provide at least one service to at least one device through at least one transport, the steps comprising:
   providing a primary interface, the primary interface having a command to enumerate transports and to enumerate devices;
   providing a transport interface for communicating with the at least one transport;
   providing a device interface for communicating with the at least one device; and
   providing a service interface for determining when an incoming connection arrives wherein the service interface comprises:
      a function to listen for an incoming connection for the at least one service;
      a function to shut down an instance of the at least one service; and
      a function to set a password required to access the at least one service.

9. The computer-readable medium of claim 8 having further computer-executable instructions for providing a service connection interface if the incoming connection comes in.

10. The computer-readable medium of claim 9 wherein the service connection interface comprises:
    a function to accept a connection;
    a function to close the connection;
    a function to listen for at least one incoming command request from the at least one of the at least one device; and
    a function to enumerate properties of the connection.

11. The computer-readable medium of claim 10 having further computer-executable instructions for providing a command structure if the at least one incoming command request is received.

12. The computer-readable medium of claim 11 wherein the command structure comprises:
    a pointer to an interface to enumerate at least one header that came in with the incoming connection;
    a function to generate a response code; and
    a stream interface.

13. The computer-readable medium of claim 12 wherein the stream interface comprises:
    a function to read data from a stream;
    a function to write data to the stream;
    a function to instruct the stream to use data from a specified file; and
    a function to instruct the stream to write data to the specified file.

14. The computer-readable medium of claim 8 wherein the device interface comprises:
    a function to connect to a device;
    a function to disconnect the device;
    a function to send data to the device; and
    a function to get data from the at least one service.

15. The computer-readable medium of claim 8 wherein the primary interface comprises:
    a function to enumerate transports;
    a function to enumerate devices; and
    a function to register a service.

* * * * *